United States Patent [19]
Hill, III

[11] Patent Number: 6,089,292
[45] Date of Patent: Jul. 18, 2000

[54] DURABLE, SMOOTH RIDE WHEEL AND SOLID RUBBER TIRE

[76] Inventor: Giles Hill, III, c/o Southeast Tire Co., P.O. Box 809, Idabel, Okla. 74745

[21] Appl. No.: 09/086,198

[22] Filed: May 28, 1998

[51] Int. Cl.[7] .................................................. B60C 7/08
[52] U.S. Cl. ........................................ 152/302; 152/303
[58] Field of Search .................................. 152/300, 301, 152/302, 303, 323

[56] References Cited

U.S. PATENT DOCUMENTS

| | | |
|---|---|---|
| 859,078 | 7/1907 | Kempshall . |
| 991,737 | 5/1911 | Moore . |
| 1,104,783 | 7/1914 | Drabold et al. . |
| 1,232,275 | 7/1917 | Giberson . |
| 1,246,756 | 11/1917 | Kitterman . |
| 1,263,947 | 4/1918 | Shomer et al. . |
| 1,301,230 | 4/1919 | Cooper . |
| 1,399,180 | 12/1921 | Bailey et al. . |
| 1,424,134 | 7/1922 | Litchfield . |
| 1,499,809 | 7/1924 | Duke . |
| 1,544,639 | 7/1925 | Fowler . |
| 1,591,982 | 7/1926 | Kirkwood . |
| 1,867,438 | 7/1932 | Baeck . |
| 2,709,471 | 5/1955 | Smith et al. ............................. 152/310 |
| 2,882,950 | 4/1959 | Grove ...................................... 152/302 |
| 2,896,687 | 7/1959 | Smith et al. ............................. 152/310 |
| 2,955,637 | 10/1960 | Hartzmark ............................... 152/397 |
| 3,018,809 | 1/1962 | Bernard ..................................... 152/41 |
| 4,573,510 | 3/1986 | Ippen et al. ............................. 152/159 |
| 4,921,029 | 5/1990 | Palinkas et al. ........................... 152/11 |
| 4,966,212 | 10/1990 | Hill ......................................... 152/302 |
| 5,053,095 | 10/1991 | Hill ......................................... 156/112 |
| 5,265,659 | 11/1993 | Pajitas et al. ............................ 152/329 |
| 5,429,165 | 7/1995 | Ichikawa et al. ........................ 152/302 |

FOREIGN PATENT DOCUMENTS

| | | | |
|---|---|---|---|
| 6-16003A | 1/1994 | Japan ..................................... | 152/302 |

*Primary Examiner*—Michael W. Ball
*Assistant Examiner*—B J. Musser
*Attorney, Agent, or Firm*—John W. Montgomery; Gardere & Wynne, L.L.P.

[57] ABSTRACT

A wheel and solid rubber tire assembly as provided with a metal wheel having a predetermined diameter and a cylindrical rim around the periphery of the wheel. The rim has a predetermined narrow width. A soft narrow layer of rubber is secured to the narrow rim and has a first diameter and a first width at the first diameter approximately equal to the narrow width of the rim. The soft layer has a second predetermined diameter larger than the first diameter. A wide wear layer of solid rubber, having a width that is significantly greater than the width of the narrow layer, is bonded to the narrow layer at the second diameter. The wear layer has a predetermined maximum outer diameter that is larger than the second diameter of the inner soft layer. The wear layer has a hardness greater than the hardness of the soft narrow layer. The movement of the soft inner layer upon compression is increased per pound of impact so that a smoother ride is provided.

12 Claims, 2 Drawing Sheets

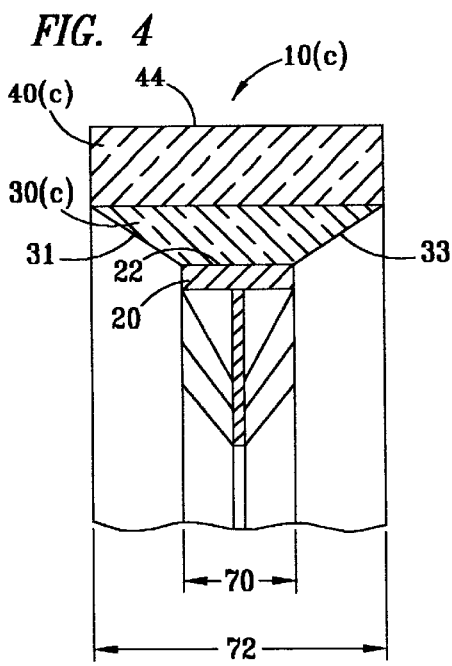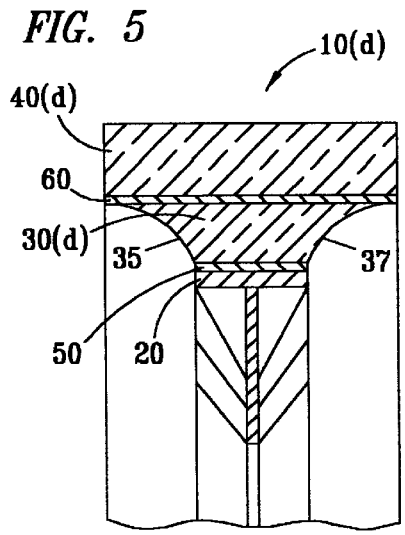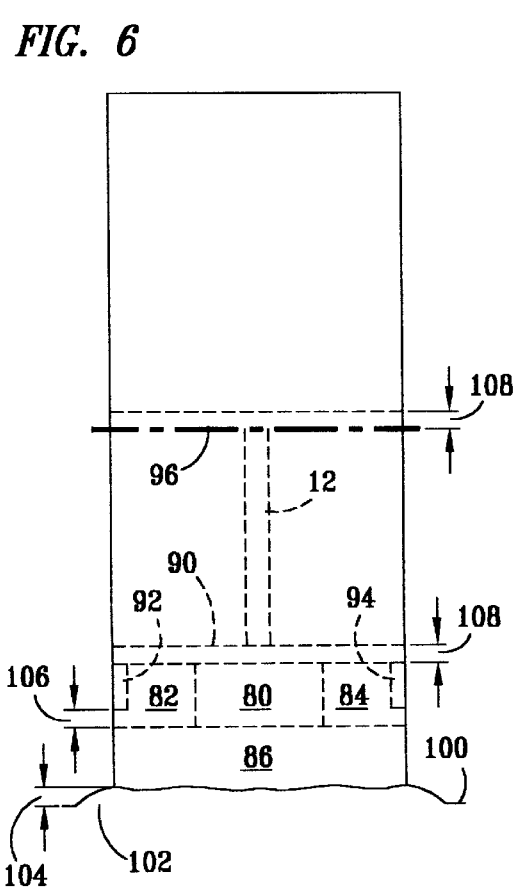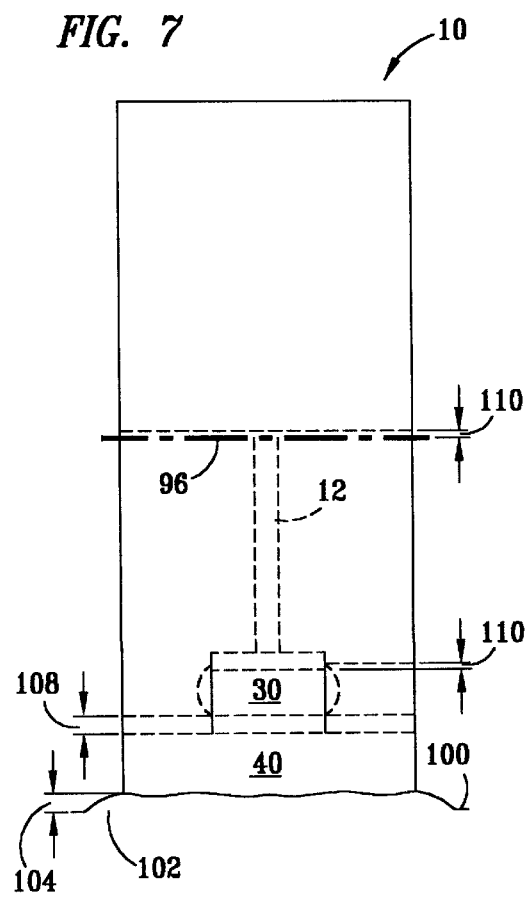

DURABLE, SMOOTH RIDE WHEEL AND SOLID RUBBER TIRE

BACKGROUND OF THE INVENTION

In the construction industry, heavy rolling equipment has advantageously used flat-proof, solid rubber, low profile tires on constructed to avoid slippage on metal wheel rims.

This construction advantageously avoided difficulties with punctured pneumatic tires or "flats" and also avoided the excessive weight and increased wear and breakdown of standard pneumatic tires filled with fluid rubber, elastomeric or urethane form material, which solidified in the tires to avoid flats. Downtime was reduced and cost-effective, economic usage in many applications for heavy equipment previously dominated with pneumatic tires proved such tires highly reliable and important in the industry. Particularly, for example, underground mining applications where downtime for changing pneumatic tires is extremely expensive, such rubber tires have become very important. Junkyard or metal yards or scrap metal facilities where puncturing of pneumatic tires is of prime concern, such solid rubber tires for large construction equipment have become important industry components.

Innovations in the area of wheel and solid rubber tire technology have been demonstrated in U.S. Pat. No. 4,966,212, issued to Giles Hill, Oct. 30, 1990 for a wheel and tire assembly with a solid rubber tire for use on heavy construction equipment. The assembly included a mounting disk, a large diameter rim having a circular surface rigidly affixed to the mounting disk, and having axially-opposed peripheral sides. Cross-ribs were rigidly fastened to the cylindrical surface of the rim across the cylindrical rim surface. Metal side support rims were rigidly affixed to and radially projecting from the peripheral side of the cylindrical rim surface. A base layer of even thickness of substantially flat rubber was submitted to the cylindrical surface, interposed between the cross-ribs and the side support rims. Multiple additional layers of even thickness of substantially flat sheet rubber were bonded to the base layer, and each succeeding additional layer was bonded to the preceding additional layer until a low profile, solid rubber tire was obtained. The solid rubber tire was thus bonded directly to the large diameter wheel rim for use on heavy construction equipment.

An improved method of constructing a wheel and low profile solid rubber tire was disclosed in U.S. Pat. No. 5,053,095, issued to Giles Hill, Oct. 1, 1991, for an improved method of constructing a wheel and tire assembly with a solid rubber tire for use on heavy construction equipment. The method included a mounting disk, a large diameter rim having a cylindrical surface and axially-opposed peripheral sides attached to the mounting rim. Cross ribs were rigidly fastened to and laterally across a cylindrical surface. There were side supporting rims rigidly affixed and radially projecting from the peripheral side of the cylindrical rim surfaces. A base layer of even thickness of substantially flat rubber was cemented to the cylindrical surface interposed between the cross rib and the side support rims. Multiple additional layers of even thickness substantially flat rubber were bonded to the base layer and each succeeding layer of even thickness was bonded to the preceding additional layer.

In both U.S. Pat. Nos. 4,966,212 and 5,053,095, it was contemplated that an interior core of a plurality of layers sequentially bonded rubber could include a softer rubber material surrounded on both sides by harder rubber sidewalls. The soft rubber core was designed to increase the flexibility of the solid rubber tire. However, in practice the increase in flexibility and cushioning of the ride due to the solid rubber core was significantly offset by the increased cost of producing sequential layers having side portions of one hardness rubber and a central portion of softer rubber. For this reason, such soft core solid rubber tires have not yet gained wide acceptance in the marketplace.

Previous attempts to smooth the ride have included putting air pockets or holes in the rubber below the wear layer or the tread layer thereby reducing the amount of rubber absorbing the impact between the outer wear layer and the rim. These attempts have provided some cushioning and have met with some success relative to other solid rubber tires. However, as the tread wears down there can be uneven support for the wear layer depending upon whether there is an air pocket or a web or spoke of rubber extended between the rim and the wear layer. This can lead to ripples developing in the tire when the tread wears thin.

SUMMARY OF THE INVENTION

These and other disadvantages of the prior art have been overcome in the present invention by providing a narrow cylindrical rim, a layer of soft, durable rubber continuously formed, attached or bonded to the rim around the entire circumference also having a portion thereof with a width approximately corresponding to the narrow width of the wheel rim, and a wear layer of solid rubber attached or bonded entirely around the outer circumference of the softer rubber layer and substantially wider than the rim and that portion of the softer rubber tire having a width corresponding to the rim so that the entire width of the wear layer provides the desired traction and load carrying capability for the tire on heavy construction equipment and the narrower soft rubber portion acts to carry the entire load and therefore has increased amounts of compression because of the reduced area of softer rubber carrying the load applied to the larger area of the harder wear rubber.

According to this invention, a solid rubber tire and wheel assembly can be made with an improved structure to provide greater cushioning that previous solid rubber tires while maintaining good wear characteristics. It has been found that the soft inner core surrounded by harder rubber in a solid rubber tire provides some cushioning effect as was described in earlier U.S. Pat. Nos. 4,966,212 and 5,053,095 issued to Giles Hill. It has recently been discovered that a greater degree of movement of the outer layer can be obtained if the entire outer layer pushes on a smaller area of soft inner core. It is theorized that because all of the weight is carried by the smaller area of softer rubber, the total distance of compression is greater. This provides greater bump impact-absorbing characteristics and smooths the ride significantly. The present invention can approach the riding smoothness of a pneumatic tire while eliminating punctures and the costly downtime associated with changing pneumatic tires on large tractors and other construction equipment. No ripples develop when the wear layer wears very thin.

The present invention therefore accomplishes a smoother ride uniquely by providing a continuous inner softer layer of rubber but which core has a reduced width so that the surface area of the wear layer is substantially greater than the surface area of the softer inner layer. Thus, the width of the metallic rim is reduced and an inner rubber layer of about 25–35 Durometer (Scores A scale) extends across the reduced width and may also have tapered or angled sides expanding outward to where the soft rubber layer connects and is bonded to a wider wear layer of rubber. The outer wear layer is much wider than the rim and thus provides the ground contact area required for effective traction. The wear layer may be in the range of 60–70 Durometer (Scores A scale).

In an alternative embodiment of the invention and to further provide significant strength of bonding between the continuous narrow soft rubber layer and the metal rim, a primer layer of hard rubber, which may be in the range of 75–95 Durometer (Scores A scale), is bonded between the rim and the soft inner layer. A wider bonding layer of hard rubber is bonded between the narrow soft inner layer and the wider outer wear layer. The bonding layer is also preferably in a range of about 75–85 Durometer (Scores A scale).

In one particular embodiment for example, the rim, the primer layer and the narrow soft rubber are about 11–12 inches wide and the bonding layer of hard rubber and the wear layer are about 23–24 inches wide. It has been found that the width of the wear layer at about two times the width of the rim effectively reduces the area of contact of the soft inner layer, allowing it to compress under normal loading about two times as much as a softer rubber on a rim which has the same width as the wear layer. Because the soft layer is continuously compressed about two times as much as normal, the range of movement under impact with bumps and debris is also about two times as much, so that the bumping movement at the axle of the vehicle upon impact with an object is reduced by about one-half, thereby significantly smoothing the ride.

BRIEF DESCRIPTION OF THE DRAWINGS

These and other objects and advantages of the invention may be more fully understood with reference to the following detailed description, claims and drawings in which drawings, like numerals, represent like element and in which:

FIG. 4 is a partial cross-sectional view of another alternative embodiment of the invention viewed along a cross-section schematically shown at section line II—II of FIG. 1;

FIG. 5 is a partial cross-sectional view of yet another alternative embodiment of the invention;

FIG. 6 is a schematic depiction of a comparative model of a conceptual wheel and solid rubber tire assembly with a soft rubber core and harder side and tread portions rolling over a bump; and FIG. 7 is a schematic depiction of flexure characteristics of a wheel and tire assembly according to an embodiment of the invention for comparison to the conceptual wheel and the assembly of FIG. 6.

DETAILED DESCRIPTION OF THE PREFERRED EMBODIMENTS

Figure 1:
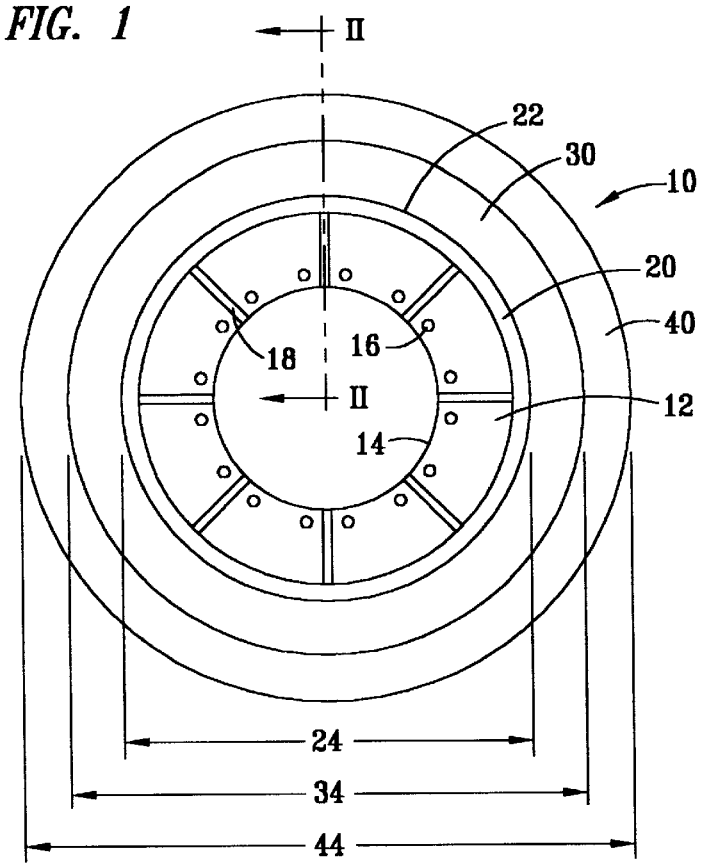
FIG. 1 is a side schematic view of a wheel rim and solid rubber tire according to the present invention.

FIG. 1 is a schematic side planned of a wheel and solid rubber tire assembly 10, having a metallic wheel 12 with an inner hub opening 14, a bolt pattern 16 for connection to a construction vehicle hub support ribs 18 spaced radially around the wheel and supportingly fastened to a cylindrical rim 20. There is an inner layer of continuous soft rubber 30 securely connected to the exterior surface 22 of rim 20 at a predetermined diameter 24. There is also a wide wear layer of rubber 40, having a width substantially greater than the width of the narrow soft rubber layer 30 and having a hardness that is significantly harder than the soft narrow rubber layer 30. Wear layer 40 is securely attached continuously around the perimeter at predetermined diameter 32 of narrow inner layer 30.

Figure 2:
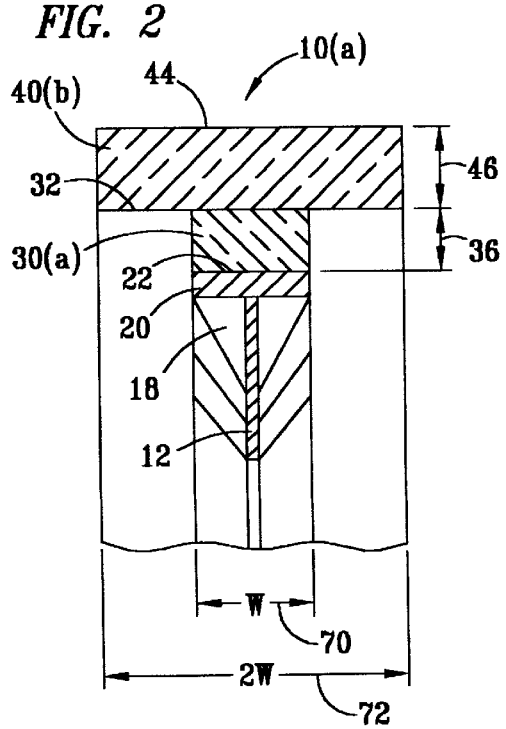
FIG. 2 is a partial cross-sectional view of one embodiment of a wheel and tire assembly according to the invention viewed along a cross-section schematically shown at section line II—II of FIG. 1.

FIG. 2 depicts a partial cross-section of a wheel 10 according to one embodiment viewed at the position of section line II.2 of FIG. 1. In the embodiment shown in FIG. 2 indicates that the width W of the rim 20 and narrow inner layer 30 is approximately one-half the width 2 W of the wear layer 40. The inner layer 30 is bonded directly to the rim 20 at surface 22 which corresponds to the rim diameter 24 of FIG. 1 and the wear layer 40 is bonded directly to cylindrical surface 32 of continuous inner layer 30 which surface 32 corresponds to diameter 34 of FIG. 1. The thickness 36 of inner layer 30 is in the range of about 2–6 inches and the thickness 46 of the wear layers in the range of about 7–12 inches.

Figure 3:
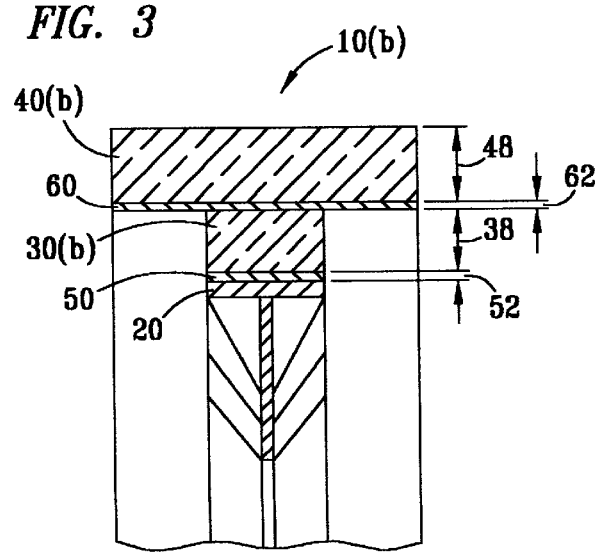
FIG. 3 is a partial cross-sectional view of an alternative embodiment of a wheel and solid rubber tire assembly viewed along a cross-section schematically shown at section line II—II of FIG. 1.

FIG. 3 depicts an alternative preferred embodiment of a partial cross-section of a wheel and solid rubber tire assembly according to the present invention again with the width of layer 30 approximately one-half the width of narrow soft layer of rubber 30, approximately one-half the width of wide wear layer of rubber boarding fording. In this embodiment to facilitate bonding between the narrow soft inner layer 30 and the rim 20, a hard rubber primer layer 50 is provided bonded to the rim and to the inner layer there between at diameter 24 of the rim. The thickness 52 of primer layer 50 may be in the range of ¾ths of an inch to one and one-half inches. The hardness of primer layer 50 may advantageously be in the range of about 75–85 Durometer (Scores A scale). Also depicted in the embodiment of FIG. 3 in the embodiment of wheel and tire assembly 10(b) of FIG. 3 is a bonding layer 60 bonded between soft inner layer 30 and wider wear layer 40 at diameter 34. The thickness 62 of bonding layer 60 is in the range of between about ¾" and 1½" and the hardness is advantageously in the range of between about 75–85 Durometer (Scores A scale). To maintain the same maximum diameter 44, either the rim diameter 24 may be reduced or, alternatively, the thickness 38 of wear layer 30 may be less than thickness 36 as with the embodiment in FIG. 2 and the thickness 48 of wear layer 40 may be less than the thickness 46 of wear layer 40 in the embodiment of FIG. 2.

FIG. 4 depicts the embodiment of the invention in which the soft inner layer 30(c) includes angled sides 31 and 33 which expand the width of soft inner layer 30 from the interior narrow width 70 of rim 20 to the wider width 72 of wear layer 40(c). In this embodiment increased durability is obtained with the angled transition from the narrow width 70 to the wider width 72 and increased compression flexibility is still maintained because of the reduced support area on surface 22 of rim 20.

FIG. 5 depicts yet another preferred alternative embodiment in which soft inner layer 30(d) is coupled between rim 20 with a hard primer layer 50. Further, soft inner layer 30(d) is provided with concave curved sides 35 and 37 expanding from narrow width 70 to wider width 72. Also bonded between layer 30(d) and wear layer 40(d) is the bonding layer 60 of hard rubber.

With reference to both FIGS. 6 and 7 in which FIG. 6 is a schematic depiction of a wheel and solid rubber assembly in which a soft inner core 80 is provided surrounded by harder side portions 82 and 84 and a wear layer 86 according previously known construction in such previous construction there was also a rim 90 had projections 92 and 94 on either side extending at least partially up the sidewalls of side sections 80 and 84. Rim 90 is supported from the vehicle along axis 96. Upon rolling along the surface 100 the entire solid rubber tire is compressed slightly and upon impacting an obstacle 102, the height 104 of obstacle 102 must be accommodated by either compression of the solid rubber or raising of the axle. With the inner core and compensability of the rubber tire, the solid rubber may compress to a small degree so that the interface between the hard rubber layer 86 and the core 82, 84 move to a lesser amount 106 than the distance 104 and additional compression of layer 82, 80 and 84 cause the rim 90 to move even a smaller amount 108 which distance 108 was translated directly to movement of the axle, a distance 108. In the circumstances depicted with the prior construction, the distance 108 was only slightly less than the distance 104 or the obstacle causing a bumpy, rough ride.

Turning now to FIG. 7 which is a schematic depiction of a rim and solid rubber tire according to the present invention, impact of the wheel with the same obstacle 102 requires the wheel to accommodate a height 104. The wear layer 40 compresses only slightly so that the interface between the wear layer 40 and the narrow inner layer 30 moves a distance 106 which is substantially equivalent to the distance of the previous device shown in FIG. 6. However, the increased compensability of soft inner layer 30 accommodate almost the entire movement distance 106 such that the movement distance 110 of rim 20 is about one-half the movement distance 108 as would be experienced with the construction of FIG. 6. Thus the movement of the axle 110 is reduced by about one-half, thereby smoothing the ride substantially.

Other alterations and modifications of the invention will likewise become apparent to those of ordinary skill in the art upon reading the present disclosure, and it is intended that the scope of the invention disclosed herein be limited only by the broadest interpretation of the appended claims to which the inventors are legally entitled.

What is claimed is:

1. A wheel and solid rubber tire assembly comprising:
   a. a metal wheel having a predetermined diameter and a cylindrical rim around the periphery of said metal wheel, said rim having a predetermined narrow width;
   b. a soft layer of rubber secured to said narrow rim, having a hardness in a range of 25 to 40 Durometer (on the Shore A Scale), having a first diameter and a first width at said first diameter, said first width approximately equal to said predetermined narrow width of said rim, and further having said soft layer with said narrow width at a second diameter larger than said first diameter; and
   c. a wear layer of solid rubber having a width substantially greater than said narrow width of said rim and soft layer and a thickness of more than 44% of the thickness of the tire, said wear layer comprising rubber having a hardness greater than about 60 Durometer (on the Shore A Scale), said wear layer secured to said soft layer at said second diameter so that a disparity in width results between said soft layer and said wear layer, said wear layer having a maximum diameter greater than said second diameter of said soft layer of rubber.

2. A wheel and solid rubber tire assembly as in claim 1, further comprising:

a. a primer layer of rubber having a hardness in a range of 75–85 drometer (on the Shore A Scale), said primer layer bonded at said first layer to said said soft layer and bonded to said cylindrical rim thereby securing said narrow layer to said narrow rim; and
   b. a second bonding layer of hard rubber at said second diameter bonded between said soft narrow layer and said wide wear layer.

3. A wheel and solid rubber tire assembly as in claim 1 wherein said first narrow layer of soft rubber has said first narrow width at said rim and has a second width at said second diameter, at which second diameter said narrow soft layer is bonded to said wide wear layer.

4. A wheel and solid rubber tire assembly as in claim 1 where said soft layer comprises a rubber material having an average hardness in the range of about 25–40 Durometer (measured on the Shore A scale at room temperature) and said wide wear layer has an average hardness in the range of between about 60 and 70 Durometer (measured on the Shore A scale at room temperature).

5. A wheel and solid rubber tire assembly as in claim 2 wherein said soft narrow layer of rubber has an average hardness in the range of 25–40 Durometer (Shore A scale);
   a. said wear layer has an average hardness in the range of between 60 and 70 Durometer (Shores A scale); and
   b. said primer layer and said bonding layer each having an average hardness in the range of between about 75–85 Durometer (Shores A scale).

6. A wheel and solid rubber tire assembly as in claim 1 wherein said width of said rim and also of said narrow soft rubber layer is predetermined at approximately two inches per 1,000-pound maximum load carrying capacity of said wheel and tire assembly (so that an 8-inch wide narrow layer has a maximum load of 4,000 pounds) and said wider width of said wear layer is approximately four inches per 1,000-pound load carrying capacity of said wheel and tire assembly (so that a 16-inch wide wear layer also has a maximum load of 4,000 pounds).

7. A wheel and solid rubber tire assembly as in claim 1 wherein said predetermined width of said rim and narrow layer is approximately one-half of said predetermined width of said wear layer.

8. A wheel and solid rubber tire assembly as in claim 1, claim 2, or claim 3 wherein said narrow soft rubber layer extends continuously around the periphery of the tire.

9. A wheel and solid rubber tire assembly as in claim 1, 2 or 3 wherein said narrow layer of rubber is free to expand its width upon compression up to about one and one-half times said predetermined first width of said narrow layer of soft rubber.

10. A wheel and said rubber tire assembly as in claims 1, 2 or 3 wherein:
    a. said narrow layer of soft rubber has a thickness in the range of about 6–8 inches and a width approximately one-half (½) of the width of said wear layer; and
    b. said wide wear layer has a thickness in the range of about 9–11 inches and a width approximately twice the width of said soft narrow layer.

11. A wheel and solid rubber tire assembly comprising:
    a. a metal wheel having a predetermined diameter and a cylindrical rim around the periphery of said metal wheel, said rim having a predetermined narrow width;
    b. a primer layer of hard rubber having a hardness in the range of 75–85 Durometer (on the Shores A scale) bonded to the periphery of said metal wheel cylindrical rim, and primer layer having said predetermined narrow width;

c. a soft layer of rubber bonded to said primer layer having a hardness in the range of about 25–40 Durometer (on the Shores A scale) and having said predetermined narrow width;

d. a bonding layer of rubber having a hardness in the range of 75–85 Durometer (on the Shores A scale) bonded to said soft layer of rubber around a periphery thereof, said bonding layer having a wide width approximately twice the width of said predetermined narrow width of said metal wheel rim, said primer layer and said soft layer of rubber secured to said primer layer; and e. a wear layer of solid rubber having a width substantially equal to said bonding layer, said wear layer having a hardness greater than about 60 Durometer (on the Shores A scale).

12. A wheel and solid rubber tire assembly comprising:

a. a metal wheel having an outwardly disposed cylindrical metal surface and a predetermined diameter without sidewalls projecting outwardly from said predetermined diameter;

b. a primer layer of hard rubber having a hardness in the range of 75–85 Durometer (on the Shores A scale) bonded to said cylindrical metal surface, said primer layer having a said predetermined narrow width;

c. a soft layer of rubber bonded to said primer layer having an average hardness in the range of about 25–40 Durometer (on the Shores A scale) and having said predetermined narrow width along the surface of bonding to said primer layer and progressively expanding to a second width approximately twice the width of said predetermined narrow width;

d. a bonding layer of rubber having a hardness in the range of 75–85 Durometer (on the Shores A scale) bonded to said soft layer of rubber around a periphery thereof at said second width approximately twice said predetermined narrow width; and e. a wear layer of solid rubber having a width substantially equal to or greater than said bonding layer, said wear layer having a hardness greater than about 60 Durometer (on the Shores A scale).

* * * * *